(12) United States Patent
Bobee et al.

(10) Patent No.: US 8,003,717 B2
(45) Date of Patent: Aug. 23, 2011

(54) ROOFING FELT COMPOSITION

(75) Inventors: David Bobee, Petit Couronne (FR); Alain Marcel Bernard Seive, Petit Couronne (FR); Anne Claire Rebuffatti, Petit Couronne (FR)

(73) Assignee: Shell Oil Company, Houston, TX (US)

( * ) Notice: Subject to any disclaimer, the term of this patent is extended or adjusted under 35 U.S.C. 154(b) by 205 days.

(21) Appl. No.: 12/093,073

(22) PCT Filed: Nov. 9, 2006

(86) PCT No.: PCT/EP2006/068298
§ 371 (c)(1), (2), (4) Date: May 8, 2008

(87) PCT Pub. No.: WO2007/054541
PCT Pub. Date: May 18, 2007

(65) Prior Publication Data
US 2008/0255277 A1    Oct. 16, 2008

(30) Foreign Application Priority Data
Nov. 10, 2005    (EP) .................................... 05292400

(51) Int. Cl.
*C08L 95/00*    (2006.01)

(52) U.S. Cl. ................................ 524/59; 524/62; 524/69

(58) Field of Classification Search ..................... 524/62, 524/59, 69
See application file for complete search history.

(56) References Cited

U.S. PATENT DOCUMENTS
4,707,413 A    11/1987   Kehr et al. .................... 428/440

FOREIGN PATENT DOCUMENTS

| | | | |
|---|---|---|---|
| EP | 1268712 | | 1/2003 |
| EP | 1498469 | | 1/2005 |
| GB | 1232791 | * | 5/1971 |
| WO | WO9911737 | | 3/1999 |
| WO | WO9934917 | | 7/1999 |
| WO | WO0216499 | | 2/2002 |
| WO | WO02102941 | | 12/2002 |
| WO | WO 2004/009739 A2 | * | 1/2004 |
| WO | WO2004009739 | | 1/2004 |

OTHER PUBLICATIONS

International Search Report dated Jan. 22, 2007.

* cited by examiner

*Primary Examiner* — Robert D. Harlan

(57) ABSTRACT

The invention is directed to a novel bitumen composition comprising a paraffin wax, wherein the wax has a congealing point of between 85 and 120° C. and a PEN at 43° C., expressed in 0.1 mm, as determined by IP 376 of more than 5.

10 Claims, 2 Drawing Sheets

Figure 1 (Comparative experiment A)
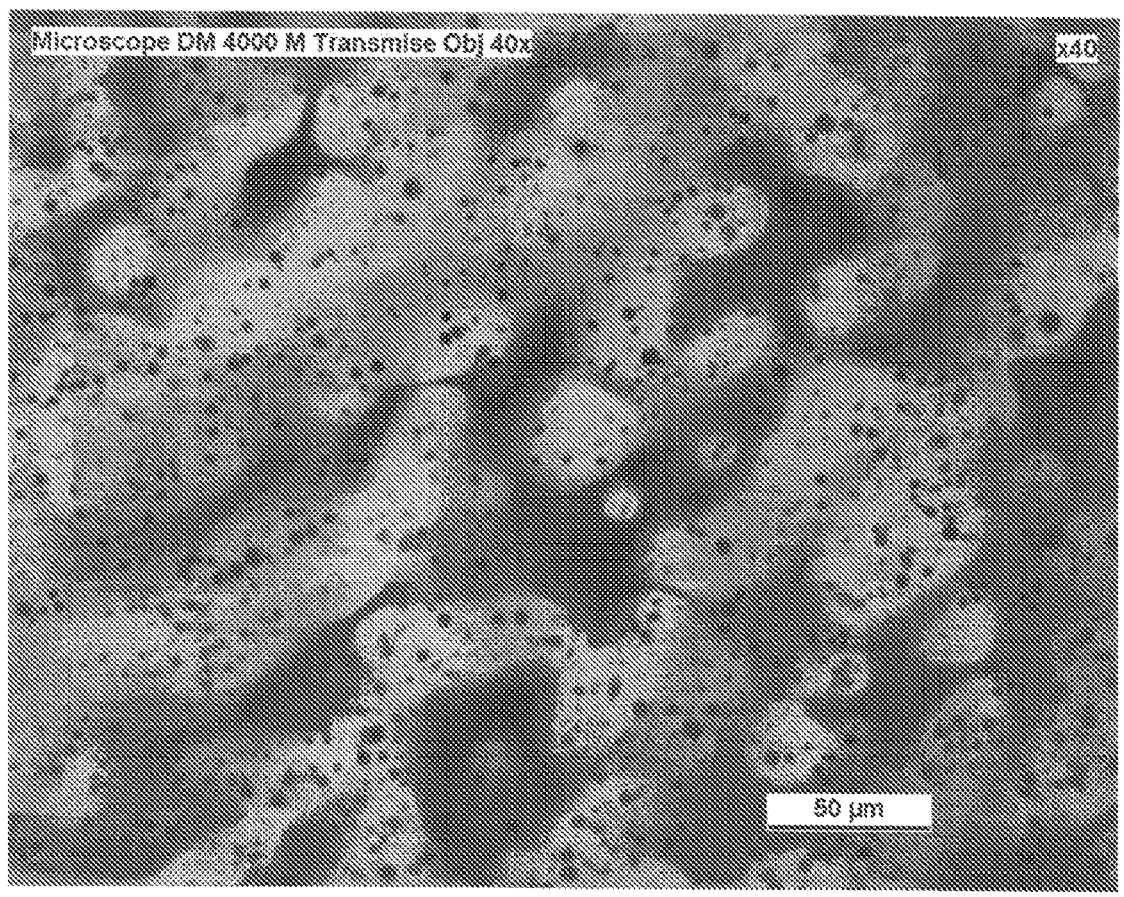

Figure 2 (Example 1)
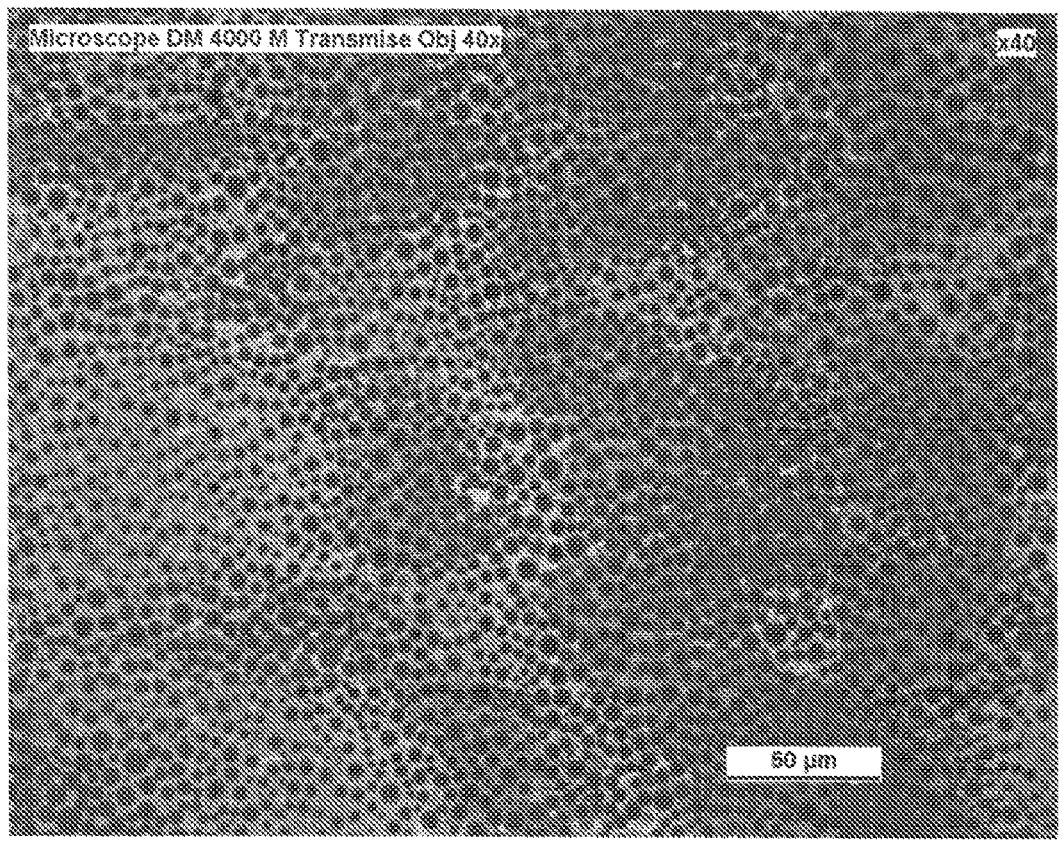

ROOFING FELT COMPOSITION

PRIORITY CLAIM

The present application claims priority to European Patent Application 05292400.8 filed 10 Nov. 2005.

FIELD OF THE INVENTION

The invention is directed to a roofing felt composition comprising a carrier and a coating, said coating comprising a polymer-modified bitumen.

BACKGROUND OF THE INVENTION

Roofing felt compositions are suitably used to lay on top of buildings to provide waterproofing. Roofing felt compositions are widely known and for example described in the Shell Bitumen Industrial Handbook, ISBN-0-95-16625-1-1, London, 1995, chapter 8.1.3, pages 208-253.

WO-A-99/011737 discloses a bitumen composition for producing a road topping containing a Fischer-Tropsch paraffin (FT paraffin) as an additive. According to this publication the Fischer-Tropsch paraffin additive is a mixture of more than 90% n-alkanes and the remainder being iso-alkanes. A commercial available Fischer-Tropsch additive is SASOBIT, which is marketed by Sasol Wax Ltd.

WO-A-02/16499 also discloses a bitumen composition for producing a road topping containing a Fischer-Tropsch paraffin (FT paraffin) as an additive.

In the field of roofing felt applications it is important to achieve a so-called phase inversion. This is achieved by adding a polymer to the bitumen. It is an object to add as little polymer to the bitumen due to its costs. The content of polymer will be dependent on the quality of the bitumen used.

SUMMARY OF THE INVENTION

The invention provides a roofing felt composition wherein the content of polymer can be reduced while still achieving phase inversion.

This object is achieved by the following composition. Roofing felt composition comprising a carrier and a coating, said coating comprising a polymer modified bitumen and a paraffin wax, wherein the wax has a congealing point (as determined by ISO 2207) of between 85 and 120° C. and a PEN at 43° C., expressed in 0.1 mm, as determined by IP 376 of more than 5.

BRIEF DESCRIPTION OF THE DRAWINGS

FIG. 1 is a UV microscopy image of the phase inversion of a polymer modified bitumen.

FIG. 2 is a UV microscopy image of the phase inversion of a polymer modified bitumen according to the invention.

DETAILED DESCRIPTION OF THE INVENTION

Applicants found that by adding a paraffin wax having the properties as claimed a reduction in polymer content is achievable while achieving the desired phase inversion. Applicants further found that the cold bending performance of the roofing felt composition is significantly improved by adding the paraffin wax.

The soft paraffin wax additive having generally the combination of said congealing point and PEN values constitute for a major portion of iso-paraffins. The quantity of iso-paraffins is however difficult to quantify in this boiling range. For this reason these more easily quantifiable properties are used. The soft paraffin wax additive has a congealing point of between 85 and 120° C. and a PEN at 43° C., expressed in 0.1 mm, as determined by IP 376 of more than 5.

Preferably the congealing point of the above wax is above 90° C. The TBC-GLC recovery of the wax at 450° C. is preferably less than 2 wt %, more preferably less than 1 wt %.

Preferably a soft wax is used having a PEN at 43° C. expressed in 0.1 mm of greater than 7, more preferably greater than 8 and even more preferably greater than 10. The PEN at 43° C. is preferably below 350. The softness of the wax can be influenced by adjusting the process conditions of the manufacturing process and/or by blending soft wax and hard wax, wherein the hard wax can be a more normal paraffinic wax such as for example SASOBIT or the Sarawax SX100 or Sarawax SX105 type wax products as obtainable from Shell MDS Malaysia Sdn Bhd.

The bitumen components (further referred to as bitumen) include those with penetrations in the range of 1 to 450 and preferably between 100 and 300 mm/10 as determined in accordance with EN 1426. The softening point of suitable bitumens may range from 10 to 130 and preferably between 30 to 60° C. as determined in accordance with EN 1427.

The bitumen may be a single bitumen or any blends of relatively soft and hard bitumen or blends of bitumen and mineral oils, wherein the blend has the properties as above.

The content of soft paraffin wax additive in the coating, excluding the carrier and any optional fillers, may be up to 20 wt %, more preferably between 0.1 to 20 wt %, even more preferably between 0.5 to 10 wt %, even more preferably above 3 wt %.

The coating may comprise fillers, for example limestone. The content of the fillers is preferably between 10 to 60 wt % and more preferably between 25 and 45 wt %.

The soft paraffin wax additive may be blended with the bitumen using any suitable method. For instance, the additive may be added in divided form, for example as pellets or as a powder or in a molted state, to the bitumen. The bitumen may be in the molten state, which is at a temperature sufficient to dissolve or disperse the additive. Suitable temperatures range between 120 and 230° C., preferably, 130 and 190° C. Preferably the polymer is added to a bitumen containing the soft wax to obtain the coating of the roofing felt composition according to the present invention. Any fillers may be added to this resulting blend.

The coating will comprise of a polymer. Suitable polymers are elastomers, for example styrene-butadiene co-polymer, styrene-butadiene-styrene copolymer; plastomers, for example ethylene vinyl acetate co-polymer, poly ethylene and combinations of said polymers, reactive polymers, for example reactive ethylene ter polymer, acrylate copolymers, cross-linking agents, for example sulphur and sulphur containing compounds, adhesion dopes and IP booster, for example polyphosphoric acid.

Preferably the polymer is a styrene-butadiene co-polymer (SBS). The preferred weight percentage of SBS in the coating, excluding the carrier and any optional fillers, is between 5 and 20 wt %.

More preferably the polymer is a homopolymer or copolymer of an alpha olefin. Yet more preferably, the polymer is at least in part in a stereoregular isotactic or atactic conformation, again more preferably, the polymer comprises a polymer chain having mainly an atactic conformation.

The preferably amorphous alpha olefin polymer is thus suitably a predominantly atactic polypropylene, an amorphous copolymer of propylene, butene-1 and optionally a minor proportion of ethylene, or mixtures thereof. The propylene/butene-1 copolymer may contain from 0 to 15% of units derived from ethylene with the remainder derived from propylene and butene-1, preferably in the proportions of 60 to 70% by weight from one and the remainder from the other. Suitable materials are described in U.S. Pat. No. 4,707,413 (Col. 3, reference copolymer (a)), and are commercially available as "Vestoplast" as obtained from Degussa AG. The preferred weight percentage of the alpha olefin polymer in the coating, excluding the carrier and any optional fillers, is between 5 and 30 wt %. Preferably the content of alpha olefin polymer is as low as possible to achieve phase inversion.

The carrier comprises suitably a sheet of matted fibre. Examples of suitable carriers comprise one or more different types of fibrous materials and fabrics, among which are vegetable fibres, for example cotton, jute, flax, wood pulp, animal fibres, for example hair and wool, preferably mineral fibres, for example glass fibres, preferably synthetic fibres, for example polyester and combinations of said carriers.

The manufacture of the roofing felt composition may be performed by well known techniques as for example illustrated in the afore mentioned Shell Bitumen Industrial Handbook.

Roofing felt compositions according to the present invention may be used in moisture impermeable articles, such as waterproofing applications. Roofing felt compositions according to the present invention are suitable to protect roofs, building basements and are also used as pond liners and geomembranes for disposal areas for items such as household waste or as waterproofing layer for roads and bridges.

The soft paraffin wax additive is preferably obtained by hydroisomerisation of the substantially linear paraffin wax as obtained in a Fischer-Tropsch process. The wax having the required congealing point may be isolated by distillation from the hydroisomerised product or alternatively the feed to the hydroisomerisation is so chosen that the soft wax additive is directly obtained from the hydroisomerised product. The properties of the wax additive as obtained in said hydroisomerisation can be suitably modified by blending the wax as obtained by said hydroisomerisation and FT paraffin comprising of more than 90% n-alkanes. Examples of the latter are the afore mentioned SASOBIT, Paraflint H1 and Sarawax SX100 and Sarawax SX105. Paraflint H1 is obtainable from Sasol-Moore and Munger. The Sarawax products are obtainable from Shell MDS Malaysia Sdn Bhd. In Table 1 a comparison is made between the properties of SASOBIT and a suitable soft paraffin wax additive for use in the roofing felt composition according to the present invention. An example is provided of the PEN at 43° C. for a 50/50 weight percent blend of SASOBIT and the soft paraffin wax additive of Table 1.

TABLE 1

|  | SASOBIT | Soft paraffin wax additive | 50/50 blend of SASOBIT and the soft wax additive |
|---|---|---|---|
| Congealing point (ISO 2207) (° C.) | 100 | 97 | — |
| Initial boiling point (° C.) TBC-GLC | 470 | 434 | — |
| TBC-GLC recovery at 450° C. (wt %) | 0 | 0.6 | — |
| TBC-GLC recovery at 500° C. (wt %) | 1.1 | 1 | — |

TABLE 1-continued

|  | SASOBIT | Soft paraffin wax additive | 50/50 blend of SASOBIT and the soft wax additive |
|---|---|---|---|
| PEN at 43° C. (0.1 mm) | 3 | >250 | 39 |

(*) the PEN at 43° C. (0.1 mm) for a similar soft wax products obtainable via the same process was 317.

Examples of the Fischer-Tropsch synthesis and routes to this soft wax additive are described in WO-A-02102941, EP-A-1498469, WO-A-2004009739 and EP-A-1268712.

Applicants found that a very suitable soft paraffin wax can be obtained as a by-product of the following process wherein middle distillates are prepared from a Fischer-Tropsch wax. This process comprises the steps of (a) hydrocracking/hydroisomerisating a Fischer-Tropsch product, (b) performing one or more distillate separations on the effluent of step (a) to obtain a middle distillate fuel fraction and a soft paraffin wax additive having an initial boiling point of between 500 and 600° C. The additive is preferably obtained as a residual fraction in a vacuum distillation step. An example of a soft paraffin wax obtained by said route is provided in Table 1. This soft paraffin wax was made according to the principle of Example 1 of WO-A-2004/009739.

The PEN value at 43° C. of the wax as obtained by said process may be reduced if required by blending this wax with a wax fraction isolated by distillation from the starting Fischer-Tropsch product. This fraction, preferably hydrogenated in order to remove oxygenates and olefins and having a congealing point of between 90 and 120° C., is a substantially normal paraffin wax having a lower PEN value at 43° C. By blending this component with the softer wax a controlled value for the PEN at 43° C. may be obtained.

In order to obtain a wax additive product having the desired PEN and congealing point in combination with a commercial attractive yield of the middle distillate main product it has been found that it is advantageous to start from a relatively heavy Fischer-Tropsch product. The relatively heavy Fischer-Tropsch product has suitably at least 30 wt %, preferably at least 50 wt %, and more preferably at least 55 wt % of compounds having at least 30 carbon atoms. Furthermore the weight ratio of compounds having at least 60 or more carbon atoms and compounds having at least 30 carbon atoms of the Fischer-Tropsch product is suitably at least 0.2, preferably at least 0.4 and more preferably at least 0.55. Preferably the Fischer-Tropsch product comprises a $C_{20}+$ fraction having an ASF-alpha value (Anderson-Schulz-Flory chain growth factor) of at least 0.925, preferably at least 0.935, more preferably at least 0.945, even more preferably at least 0.955.

The initial boiling point of the Fischer-Tropsch product as feed to step (a) may range up to 400° C., but is preferably below 200° C. Preferably any compounds having 4 or less carbon atoms and any compounds having a boiling point in that range are separated from a Fischer-Tropsch synthesis product before the Fischer-Tropsch synthesis product is used in step (a). In addition to the Fischer-Tropsch product also other fractions may be additionally processed in step (a). Possible other fractions may suitably be any excess microcrystalline wax as obtained in step (b).

Such a Fischer-Tropsch product can be obtained by any process, which yields a relatively heavy Fischer-Tropsch product. Not all Fischer-Tropsch processes yield such a heavy product. An example of a suitable Fischer-Tropsch process is described in WO-A-9934917. These processes may yield a Fischer-Tropsch product as described above.

The Fischer-Tropsch product will contain no or very little sulphur and nitrogen containing compounds. This is typical for a product derived from a Fischer-Tropsch reaction, which uses synthesis gas containing almost no impurities. Sulphur and nitrogen levels will generally be below the detection limits, which are currently 5 ppm for sulphur and 1 ppm for nitrogen. The soft paraffin wax additive will consequently also have such low sulphur and nitrogen levels. The process conditions and other directions of how to perform the above process have been reported earlier by applicant in WO-A-2004009739 which publication is hereby incorporated by reference.

The soft wax as obtained from one of the above Fischer-Tropsch processes is suitably transformed into a form in which handling of the product is facilitated. Suitable forms are containers filled with solid wax product, which containers can be heated at the location of use and wherein the wax is added to the bitumen in its liquid state. Heated containers containing the wax in its liquid state may also be used. The wax may also be provided as pellets, extrudates, flakes or powder. In order to avoid the wax particles to stick to each other silica powder and the like may be added to provide a less sticky surface of the wax particles.

The invention will be illustrated with the following non-limiting examples.

Comparative Example A

To a bitumen composition of 10 wt % mineral oil and a 90 wt % base bitumen grade having a PEN at 25° C. of 115, 20% of Vestoplast 891 as obtained from Degussa AG was added (Vestoplast is a registered trademark of Degussa AG). The resulting composition is listed in Table 2. The average softening point of the resulting polymer-modified bitumen was determined as 127.3° C. according to EN 1427 on the basis of two measurements. The phase inversion was observed by UV microscopy and was considered borderline. FIG. 1 shows the UV microscopy image.

TABLE 2

| Composition | Comparative Example A | Example 1 |
| --- | --- | --- |
| Bitumen/oil (%) | 80 | 75.2 |
| Vestoplast 891 (%) | 20 | 20 |
| Soft Wax (%) | 0 | 4.8 |

Example 1

Comparative Example A was repeated except that the soft paraffin wax of Table 1 was added to the bitumen base prior to adding the AOP. The composition is as in Table 2. The average softening point of the resulting polymer-modified bitumen containing the soft wax was determined as 142.3° C., on the basis of two measurements according to EN 1427. The phase inversion was observed by UV microscopy and was considered good. FIG. 2 shows the UV microscopy image.

The results of Example 1 vis-à-vis comparative Example 1 show that a considerable improvement in softening point is achieved in combination with good phase inversion. These results show that there is room to reduce the polymer content while still achieving phase inversion when the composition also comprises the soft paraffin wax.

Comparative Example B

An experiment was carried out on coatings (roofing felts) comprising polymer modified bitumen and filler. The poly olefin blend employed was a blend of Vestoplast 891 with a commercial fully atactic polypropylene grade and a commercial fully isotactic polypropylene, in a weight ratio of 71:17:12. The polyolefin blend was then blended with the bitumen.

Example 2

Comparative example B was repeated, except that the soft paraffin wax of Table 1 was added to the bitumen base prior to adding the AOP.

The composition of the bitumen blends is given in Table 3.

TABLE 3

| Composition | Comparative Blend B | Blend 2 |
| --- | --- | --- |
| Bitumen/oil (%) | 77 | 72.4 |
| PP* (%) | 23 | 23 |
| Soft Wax (%) | 0 | 4.6 |

*blend of poly olefin (Vestoplast 891, atactic polypropylene and isotactic polypropylene as set out above)

Coatings (roofing felts) were produced from the polymer-modified bitumen blends with 25% wt. of a limestone filler. The cold bending temperature of the coatings based on polymer-modified bitumen was determined according to EN 1109. The results are given in Table 4.

TABLE 4

| | Comparative Coating B | Coating 2 |
| --- | --- | --- |
| Penetration @ 25° C. (dmm) | 24 | 29 |
| Softening point (° C.) | >150 | >150 |
| Cold bending (° C.) | −2 | −21 |

The results in Table 4 show an impressive improvement in cold bending temperature for the polymer-modified bitumen, which also contained the soft paraffin wax.

What is claimed is:

1. A roofing felt composition comprising a carrier and a coating, said coating comprising a polymer modified bitumen and a paraffin wax, wherein the wax has a congealing point of between 85 and 120° C. and a PEN at 43° C., expressed in 0.1 mm, as determined by IP 376 of more than 5.

2. The roofing felt composition according to claim 1, wherein the paraffin wax has a PEN at 43° C. as determined by IP 376 of more than 7.

3. The roofing felt composition according to claim 1, wherein the paraffin wax has a PEN at 43° C. as determined by IP 376 of below 350.

4. The roofing felt composition according to claim 3, wherein the paraffin wax has a PEN at 43° C. as determined by IP 376 of below 70.

5. The roofing felt composition according to claim 1, wherein the bitumen component has a penetration in the range of 100 and 300 mm/10, and a softening point from 30 to 60° C.

6. The roofing felt composition according to claim 1, wherein the content of the paraffin wax is between 0.5 and 10 wt %.

7. The roofing felt composition according to claim 1, wherein the polymer of the polymer modified bitumen comprises a homopolymer or copolymer of an alpha olefin.

8. The roofing felt composition according to claim 7, wherein the polymer of the polymer modified bitumen is selected from the group consisting of an atactic polypropylene, an amorphous copolymer of propylene, butene-1 and optionally a minor proportion of ethylene, and mixtures thereof.

9. The roofing felt composition according to claim 1, wherein the paraffin wax is obtained by a process comprising the steps of (a) hydrocracking/hydroisomerisating a Fischer-Tropsch product, (b) performing one or more distillate separations on the effluent of step (a) to obtain a middle distillate fuel fraction and a soft paraffin wax additive having an initial boiling point of between 500 and 600° C.

10. The roofing felt composition according to claim 9, wherein the wax as obtained in said process is blended with a normal paraffin wax fraction having a congealing point of between 90 and 120° C. as isolated by distillation from the Fischer-Tropsch product.

* * * * *